United States Patent Office 3,041,728
Patented July 3, 1962

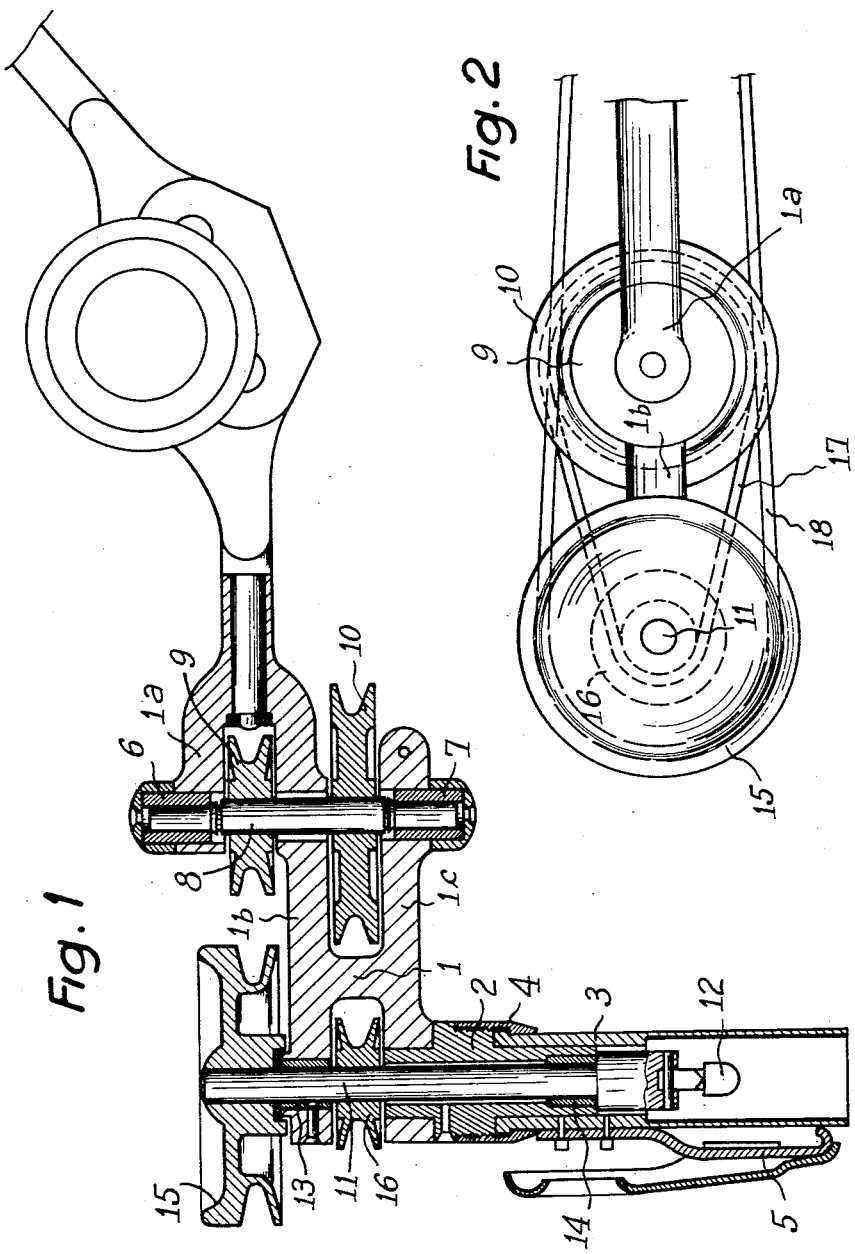

---

3,041,728
DENTAL ENGINE
Marcel Garnier, Besancon, France, assignor to Ets. Etienne Garnier & Fils, Besancon, France, a French company
Filed Feb. 10, 1958, Ser. No. 714,209
Claims priority, application France Feb. 21, 1957
3 Claims. (Cl. 32—23)

This invention relates to dental engines and more especially to appliances of the type sometimes known as wrist-joints for transmitting drive from the dental engine to a rotatable dental tool universally supported from the end of the extensible arm of the engine.

Belt transmission means are usually employed for transmitting the drive from the engine to the tool-holder mounted on the appliance. In one type of conventional appliance of this kind the drive is transmitted by way of a single drive belt directly from a drive pulley on the engine to a driven pulley on the wrist-joint appliance secured on a shaft coupled with the rotatable tool. In another conventional construction the wrist-joint appliance has an intermediate shaft provided thereon and carrying two pulleys, one of which is connected with the drive pulley on the engine by way of a main belt and the other of which is connected with a pulley mounted on the tool shaft by way of a short auxiliary belt so as to drive said shaft at an increased rate over what is obtained with the first above specified type.

In various phases of dental work it would be extremely desirable to change the rotational velocity of the dental tool from normal to high and vice versa without having to replace the krist-joint mounting the tool holder on the engine arm.

It is accordingly an object of this invention to provide an improved appliance or wrist-joint of the type described embodying means for quickly and easily altering the drive ratio of the transmission from the engine to the dental tool between a higher and a lower value.

Moreover, in the second aforementioned conventional type of wrist-joint appliance wherein an increased drive ratio is present, the intermediate shaft usually has to be journalled in a cantilever condition as a result of which the centering of the shaft tends to be disturbed and rotation is fouled.

It is therefore another object of this invention to provide an appliance of the type described including an intermediate drive ratio-multiplying shaft thereon wherein said intermediate shaft is journalled in spaced bearings and will therefore not tend to bend or become otherwise damaged.

Further objects lie in the provision of such improved wrist-joint appliance which will be comparatively simple to make, and convenient to operate and maintain.

One embodiment of the invention will now be described by way of illustration but not of limitation with reference to the accompanying drawings, wherein:

FIG. 1 is a view, mainly in axial cross section, of an improved wrist-joint appliance showing the adjacent portion of the arm of a dental engine;

FIG. 2 is an overhead plan view thereof; and

Figure 3:
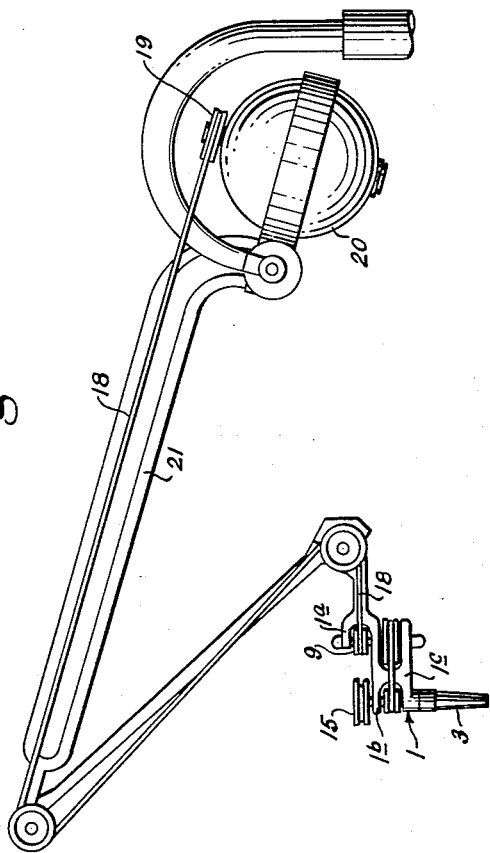
FIG. 3 is an elevational view showing the wrist-joint appliance of FIGS. 1 and 2 mounted on the extensible arm of a dental engine and driven from the motor of the latter.

Referring initially to FIGS. 1 and 2, it will be seen that my novel wrist-joint appliance comprises a body 1 generally formed with three integrally interconnected parallel flanges 1a, 1b and 1c. Force-fitted in an aperture formed near one end of the lower flange 1c, is a bushing 2. Rotatably mounted on the bushing 2 in end abutting relation with a shoulder of said bushing is a tubular sleeve 3. The sleeve 3 is retained in position upon the bushing 2 for free rotation relatively to it by means of retainer nut 4 which is screwed upon an outer screw thread formed on the enlarged upper end of said bushing 2 and has an inwardly extending flange at its lower end engaging an outwardly extending flange at the upper end of sleeve 3.

Extending through the vertical axial bore in the bushing 2 and sleeve 3 is an output spindle or shaft 11 which is rotatably supported in a smooth bearing 14 inserted in the lower end part of the bushing 2. A downwardly projecting drive element 12 is connected with the lower end of spindle or shaft 11 for driving engagement with a rotatable tool, not illustrated, adapted to be removably fitted within the sleeve 3. Secured to a side of the sleeve 3 is a conventional latch or blocking assembly 5 which is operable by finger pressure for selectively blocking and releasing the dental tool in and from the sleeve 3.

The output shaft 11 has secured to it a short distance beyond the flange 1c, a small-diameter pulley 16. The shaft 11 projects above said pulley and is further supported in a bearing 13 force fitted in an end aperture formed in the upper flange 1b of the body 1. The shaft 11 has a larger-diameter pulley 15 secured to it beyond the flange 1b.

An intermediate or auxiliary vertical shaft 8 is supported between spaced bearings 6 and 7 respectively carried in apertures formed in the topmost flange 1a and in the lowermost flange 1c at the end of it remote from that at which the shaft 11 is supported. The shaft 8 extends freely through an aperture formed in the middle flange 1b. Secured to the shaft 8 in the portions intermediate the flanges are a first relatively small-diameter pulley 9 which is generally coplanar with the pulley 15 and a larger-diameter pulley 10 generally coplanar with the pulley 16. A drive belt 17 couples the lower pair of pulleys 10 and 16 for rotation together.

A shown in FIG. 3, the wrist-joint assembly just described is supported at the extremity of an extensible arm 21 of a dental engine by means of a conventional pivotal mounting as illustrated particularly in FIG. 1. A main drive belt 18 (FIGS. 2 and 3) has one end trained over a drive pulley 19 rotated by the dental engine motor 20, and its opposite end is normally trained over the upper pulley 15 secured to the output shaft 11, as in FIG. 2. In this condition the output shaft 11 and hence the dental tool spindle coupled thereto, are driven at a predetermined normal angular velocity. This normal condition is illustrated in FIG. 2.

When it is desired for special dental work to drive the dental instrument at an increased velocity, drive belt 18 is disengaged from the groove in pulley 15 and engaged instead with the groove in pulley 9, as shown in FIG. 2. It will be evident that the output shaft 11 will now be rotated by way of the auxiliary belt drive, which has a higher drive ratio than the direct drive owing to the diameter relationship provided between the pulleys as shown.

It should be noted that when the tool is rotated at its normal or relatively low velocity by way of the direct drive the main drive belt 18 is stretched tight and its tension is so adjusted that it cannot substantially slip with respect to the pulley 15. This makes it possible to operate at the comparatively high pressures which are required at moderate drilling or grinding speeds without any tendency of the tool to be blocked. When on the other hand the high drive ratio is used, some slippage can occur due to the slacker adjusted tension of drive belt 18 or/and 17, a condition that is desirable rather than objectionable in high speed operation.

Further, owing to the novel shape imparted to the mounting or wrist-joint appliance 1, each of the shafts 8 and 11 is supported between spaced bearings near the ends of the shaft so that there is no tendency to objectionable bending of the shafts. Moreover the shifting of the belt from pulley 15 to pulley 9 and vice versa can very easily be during operation.

It will be understood that various modifications may be made in the details of the structure illustrated and described within the scope of the ensuing claims.

What I claim is:

1. In a dental engine; the combination of an extensible arm; a drive pulley rotated by a dental engine motor; and a wrist-joint assembly comprising a body pivotally mounted on said extensible arm of the dental engine, a first shaft rotatably supported on said body, means on said body for rotatably supporting a dental tool in drive-coupling engagement with said first shaft, first and second pulleys secured on said first shaft, a second shaft rotatably supported in said body parallel to, and spaced from said first shaft, spaced apart third and fourth pulleys secured on said second shaft in the planes of rotation of said first and second pulleys, respectively, the common plane of rotation of said second and fourth pulleys containing the pivoting axis of said body relative to said extensible arm, an auxiliary drive belt continuously engaged with and running around said first and third pulleys, and a main drive belt driven by said drive pulley of the dental engine and guided along said extensible arm so as to pass from the latter to said wrist-joint assembly in the plane of rotation of said second and fourth pulleys, said main drive belt being selectively engageable with one of said second and fourth pulleys so that, when said main drive belt engages said second pulley, said first shaft is driven directly from said main drive belt and, when said main drive belt engages said fourth pulley, said first shaft is driven by way of said second shaft, said first and third pulleys and said auxiliary drive belt thereby to alter the rotational speed of said first shaft.

2. In a dental engine; the combination of an extensible arm; a drive pulley rotated by a dental engine motor; a wrist-joint assembly comprising a body pivotally mounted on said extensible arm of the dental engine to turn relative to said arm about a longitudinal axis, a first shaft rotatably supported by said body and extending perpendicular to said axis, means on said body for rotatably supporting a dental tool in drive-coupling engagement with said first shaft, a second shaft rotatably supported by said body parallel to said first shaft and spaced from the latter in the direction toward said extensible arm, first and second pulleys secured on said first shaft at axially spaced locations along the latter, with the plane of rotation of said second pulley containing said longitudinal pivoting axis of the body, third and fourth pulleys secured on said second shaft in the planes of rotation of said first and third pulleys, respectively, and an auxiliary drive belt continuously engaged with and running around said first and third pulleys, said second pulley having a larger diameter than said fourth pulley and said third pulley having a larger diameter than said first pulley; and a main drive belt driven by said drive pulley of the dental engine and guided along said extensible arm so as to pass from the latter to said wrist-joint assembly in a plane also containing said longitudinal pivoting axis of said body of the wrist-joint assembly, said main drive belt being selectively engageable with one of said second and fourth pulleys so that, when said main drive belt engages said fourth pulley, said first shaft is driven at a relatively high speed by way of said second shaft, said first and third pulleys and said auxiliary drive belt, and, when said main drive belt engages said second pulley, said first shaft is driven at a relatively slower speed directly from said main drive belt with the latter clearing said fourth pulley to permit idling of said second shaft.

3. In a dental engine; the combination of an extensible arm; a drive pulley rotated by a dental engine motor; a wrist-joint assembly comprising a body pivotally mounted on said extensible arm of the dental engine and including two generally parallel, spaced apart main flanges joined together intermediate their ends and an auxiliary flange extending parallel to said main flanges and spaced from the latter, said auxiliary flange being joined to an adjacent one of said main flanges only at one end of said adjacent main flange so as to define a space therebetween opening toward the other end of said adjacent main flange, first and second shafts extending perpendicular to said flanges adjacent said other end and said one end, respectively, of said one main flange, bearings carried by said main flanges and rotatably supporting said first shaft at widely spaced locations along the latter, bearings carried by said auxiliary flange and the other of said main flanges rotatably supporting said second shaft adjacent the opposite ends of the latter, means on said body for rotatably supporting a dental tool in drive-coupling engagement with said first shaft, a first pulley secured on said first shaft between said main flanges, a second pulley secured on said first shaft at the side of said one main flange facing toward said auxiliary flange, third and fourth pulleys secured on said second shaft between said main flanges and in said space between said auxiliary flange and said one adjacent main flange, respectively, and an auxiliary drive belt running around said first and third pulleys, and a main drive belt driven by said drive pulley of the dental engine and being selectively engageable with one of said second and fourth pulleys so that, when said main drive belt engages said second pulley, said first shaft is driven directly from said main drive belt and, when said main drive belt engages said fourth pulley, said first shaft is driven by way of said second shaft, said first and third pulleys and said auxiliary drive belt thereby to alter the rotational speed of said first shaft.

References Cited in the file of this patent

UNITED STATES PATENTS

| | | |
|---|---|---|
| 2,073,704 | Mitchell | Mar. 16, 1937 |
| 2,078,859 | Lapham | Apr. 27, 1937 |
| 2,732,622 | La Hirt | Jan. 31, 1956 |